United States Patent [19]
Jolette

[11] 3,869,157
[45] Mar. 4, 1975

[54] FAN WHEEL ASSEMBLY

[75] Inventor: Gerald P. Jolette, Kalamazoo, Mich.

[73] Assignee: The Brundage Company, Kalamazoo, Mich.

[22] Filed: Jan. 27, 1972

[21] Appl. No.: 221,181

[52] U.S. Cl. ......... 403/225, 29/156.8 CF, 29/436
[51] Int. Cl. ............................................. B60b 27/06
[58] Field of Search ...... 287/52, 52.03, 52.04, 20.3, 287/85 R; 74/230.8, 230.14; 29/436, 156.8 CF

[56] References Cited
UNITED STATES PATENTS

| | | | |
|---|---|---|---|
| 2,558,589 | 6/1951 | Skolfield | 287/85 R |
| 3,094,881 | 6/1963 | Schultz | 287/52.04 |
| 3,131,468 | 5/1964 | Jordan et al. | 287/85 R |

Primary Examiner—Dave W. Arola
Attorney, Agent, or Firm—Woodhams, Blanchard and Flynn

[57] ABSTRACT

A plate and hub assembly for a blower wheel. The plate is provided with a central opening in a surrounding, axially offset and polygonal central portion thereof. A substantially cylindrical hub is provided on one end with an axially projecting annular flange of diameter less than the external diameter of the hub and receivable into the central opening of the plate. Portions of the periphery of the hub adjacent the flange are upset to define a circumferentially arranged series of flats corresponding in number and spacing to the polygonal central portion of the plate and receivable thereinto. A resilient ring of substantially channel cross section is interposed between the hub and the central opening of the plate and the annular flange is bent radially outwardly to clamp the resilient ring and plate in place on the hub. Planar, axially extending portions of the polygonal central portion of the plate interact with the flats on the hub, through a portion of the resilient ring, to provide a positive rotational drive connection between the hub and plate.

6 Claims, 7 Drawing Figures

PATENTED MAR 4 1975

3,869,157

FAN WHEEL ASSEMBLY

FIELD OF THE INVENTION

This invention relates to a hub and plate assembly for a blower wheel and more particularly relates to such an assembly in which the plate is resiliently mounted on the hub but has a positive driving connection therewith through a portion of the resilient coupling means.

BACKGROUND OF THE INVENTION

Blower wheels of the squirrel cage type normally include a hub which may be mounted on the blower shaft for rotation therewith, as well as a radially outwardly extending plate, which may be a center plate or end plate carried by the hub for rotation therewith and which in turn alone or in association with another plate or plates carries at or near its periphery a series of axially extending, circumferentially spaced blower blades. The shaft is normally carried by suitable bearings and driven as by a motor. During operation of the fan, motor vibration may be transmitted through the hub to the plate and blades producing undesirable noise. In response to this problem, it has been known in the past to provide a resilient connection or resilient intermediary member between the plate and its supporting hub to reduce vibration transmission and noise in the neighborhood of the operating blower.

Indeed, it has been known to provide an axially extending annular flange on one end of the hub, the hub and flange being of circular cross section, which is insertable loosely within a central opening in the fan wheel plate with an axially extending resilient sleeve intervening radially between the hub flange and plate whereby a radially outward upsetting of the outer portion of the flange and sleeve prevent the plate from moving axially off the hub. However, such known construction has been less than entirely satisfactory in view of a tendency for the plate to slip circumferentially with respect to the hub under various conditions such as heavy circumferential shock or torque loads applied to the plate, aging and consequent deterioration of the resilient sleeve or loosening of the connection between the plate and hub due to radially inward or axially outward deformations of the upset flange end.

Such slippage is undesirable since it prevents application of full driving power from the hub to the blades of the lower wheel. Also, frictional heat during slippage may destroy the resilient member intermediate the plate and hub, further aggravating the slippage condition and destroying firm support of the plate and blades with respect to the rotating shaft.

Attempts to eliminate such slippage have in the past resulted in bulky, multi-part resilient assemblies which are cumbersome to assemble and overly expensive and complex.

Accordingly, the objects of this invention include:
1. Provision of a hub and plate assembly for a blower wheel in which the plate is resiliently mounted on the hub to limit transfer of vibration therebetween.
2. An assembly, as aforesaid, which provides a positive mechanical interlock between the hub and plate to positively prevent relative circumferential motion therebetween but without degrading resistance to vibration transfer therebetween.
3. An assembly, as aforesaid, which utilizes a preformed, substantially channel-shaped resilient element having portions radially and axially disposed between adjacent portions of the hub and plate.
4. An assembly, as aforesaid, in which the hub and plate are provided with telescopable, chordally extending portions, such portions of the hub being axially backed by radially raised portions lying inboard of the plate, such chordal portions interacting through a portion of said resilient member to afford such circumferential interlock.
5. An assembly, as aforesaid, which provides te above-mentioned advantages without material increase in manufacturing costs, which is of simplified construction with only a single part required in addition to the hub and plate, which is capable of manufacture on a large or small scale with relatively simple tools, which is of rugged construction and which is capable of long life without attention under harsh conditions of use.

Other objects and purposes of this invention will be apparent to persons acquainted with apparatus of this general type upon reading the following specification and inspecting the accompanying drawings.

BRIEF DESCRIPTION OF THE DRAWINGS

FIG. 2 is a sectional view substantially taken on the line II—II of FIG. 1.

FIG. 6 is an enlarged fragment of FIG. 2.

FIG. 7 is an enlarged fragment of FIG. 2.

SUMMARY OF THE INVENTION

The objects and purposes of the invention are met by providing a plate and hub assembly for a blower wheel. The plate is provided with a central opening in a surrounding axially offset and polygonal central portion thereof. A substantially cylindrical hub is provided on one end with an axially projecting annular flange of diameter less than the external diameter of the hub and receivable into the central opening of the plate. Portions of the periphery of the hub adjacent the flange are upset to define a circumferentially arranged series of flats corresponding in number and spacing to the polygonal central portions of the plate and receivable thereinto. A resilient ring of substantially channel cross section is interposed between the hub and the central openings of the plate and the annular flange is bent radially outwardly to clamp the resilient ring and plate in place on the hub. Planar, axially extending portions of the polygonal central portion of the plate interact with the flats on the hub, through a portion of the resilient ring, to provide a positive rotational drive connection between the hub and plate.

DETAILED DESCRIPTION

Figure 1:
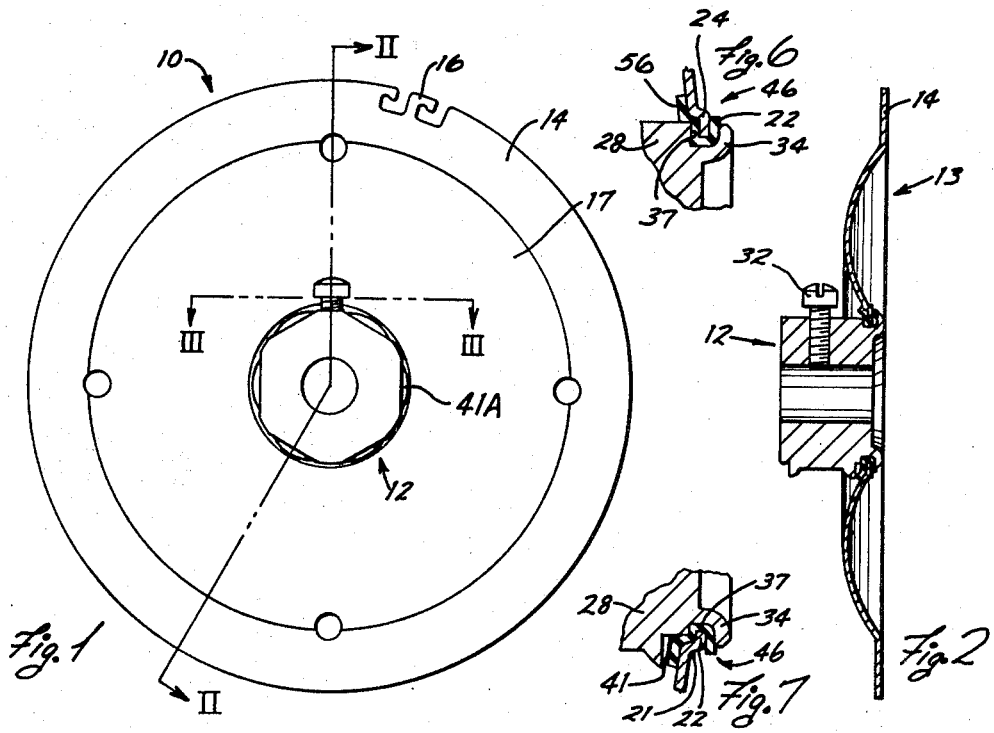
FIG. 1 is an end view of a hub and plate assembly for a blower wheel.

The assembly 10 embodying the invention comprises as shown in FIGS. 1 and 2, a hub 12 to one end of which is affixed a generally radially extending plate 13 of generally circular, disklike form and which is coaxial with the hub 12. The plate 13, in the particular embodiment shown, is the center plate of a squirrel cage type blower wheel, although it will be understood that the assembly 10 is adapted for use at other positions along the length of the blower wheel, for example, as an end support. Thus, the plate of the particular embodiment shown consists of a planar rim portion 14, the edge of which is configured to define a series of undercut teeth, one of which is shown at 16. It will be understood that normally the teeth 16 will be supplied in evenly spaced relation through the whole circumference of the plate 13. The teeth 16 are provided for engaging and fixedly supporting the blower blades (not shown) in a conventional manner. In the particular embodiment shown, the plate 13 has a belled or a curved intermediate radial portion 17, though other configurations, as desired, are contemplated.

Figure 4:
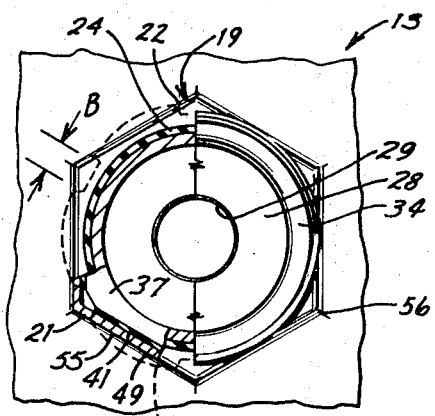
FIG. 4 is a fragmentary, partially broken, sectional view substantially as taken on the line IV—IV of FIG. 3.
Figure 5:
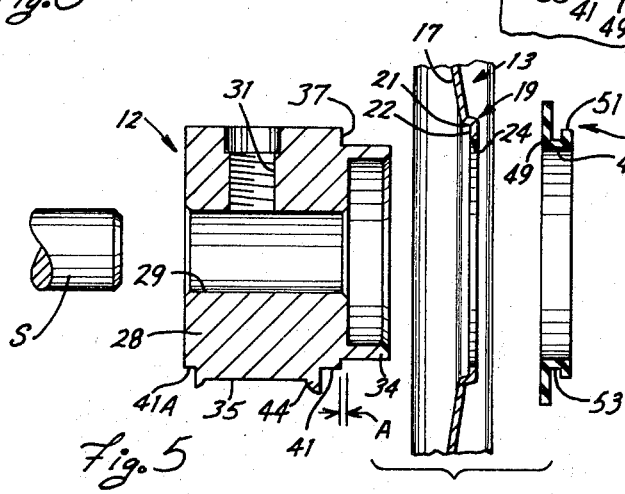
FIG. 5 is an enlarged fragment of FIG. 2 showing same in an exploded, preassembly condition.

As seen for example in FIG. 5, plate 13 has a stepped central portion 19 comprising a substantially axially extending, step 21 which extends from the intermediate portion 17 in a direction axially away from the hub 12. The stepped central portion 19 further includes a flange 22 which extends radially inwardly from the step 21. As seen from the end, as in FIG. 4, the stepped portion 19 is of regular polygonal outline, here of hexagonal outline, the step 21 thus defining a hexagonal wall coaxial with the plate 13.

A circular central opening 24 extends through the plate 13 and is defined by the radially inner edge of the radial flange 22, as seen in FIGS. 4 and 5.

The hub comprises a substantially circularly cylindrical body 28 (FIG. 5) having a central opening 29 therethrough in which is snugly but slidably receivable a shaft S for supporting the blower wheel. A tapped radial hole 31 extends through the wall of the body 28 for receiving a set screw 32 (FIGS. 1 and 2) for securing the hub to such shaft. An annular flange 34 (FIG. 5) extends coaxially rightwardly from the body 28 and is spaced radially inwardly of the periphery 35 of the body. The radially outer portion of the rightward end wall of the body 28, radially outboard of the annular flange 34, is preferably stepped leftwardly by a small increment "A." In the particular embodiment shown, the body 28 is 1 and ½ inches in diameter, the outer diameter of the annular flange 34 is about 1 and ¼ inches, the inside length of the flange 34 is about 0.26 inch and the outer wall of the flange 34 is about 0.292 inch long, whereby the leftward stepping A of the wall portion 37 is about 0.032 inch. This corresponds to an axial length of the step 21 of the plate 13 of about 3/32 inch.

In the assembled condition of the assembly 10, the flange 34 is deformed radially outwardly as seen for example in FIGS. 6 and 7, as by a spinning operation.

Figure 3:
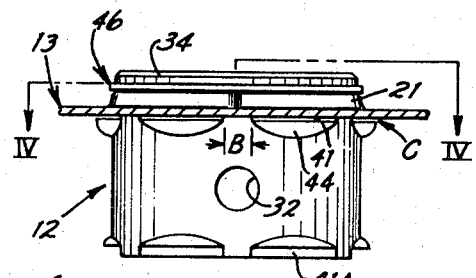
FIG. 3 is a fragmentary, enlarged, sectional view substantially taken on the line III—III of FIG. 1.

The periphery 35 of the body 28 is provided at its rightward end with a circumferentially spaced series of flats 41 (FIG. 5) which extend leftwardly from the end wall 37 and terminate in radially outwardly extending tabs 44. The flats and tabs are preferably formed by axially upsetting of the periphery of the body 28 at its righward end. The flats 41 are preferably evenly spaced along the periphery of the body 28 and correspond in number to the number of sides of the step 21 of plate 13. In the particular embodiment shown, the diameter of the body 28 is such that the flats and tabs are circumferentially spaced from each other by a distance generally indicated at B (FIG. 3). The width of the body 28 diametrally across the flats is, in the particular embodiment shown, 1 and ⅜ inch and is somewhat less than the minimal diametral spacing between opposed linear segments of the stepped wall 21 of plate 13, the latter spacing being in the particular embodiment shown about 1.43 inch. The axial length of the flats is about 5/32 inch in the particular embodiment shown. Thus, upon assembly, the annular flange 34 is loosely receivable through the central opening 24 of plate 13 and the rightward portion of the body 12 is loosely receivable within the stepped central portion 19 of plate 13 with the linear portions of stepped wall 21 loosely overlying and being parallel to the flats 41 on body 28, as generally shown in FIGS. 4, 6 and 7.

If desired, the other (leftward as seen in FIG. 5) end of the body 12 may also be provided with one or more flats 41A in a similar manner. The flats 41A may be used, for example, for assisting registration of the flats 41 with the linear portions of stepped wall 21 of the plate during assembly.

The assembly 10 further includes a resilient annular member, or hub isolator, 46 (FIG. 5). The member 46 is of substantially J-shaped, or modified channel-shaped, cross section and is preferably of neoprene. Thus, the hub isolator 46 has an axially extending, radially inner bight wall 47 terminating at its leftward end in a radially extending inner wall 49 and at its rightward end in an axially extending outer wall 51, the inner wall 49 being substantially longer than the outer wall 51. The walls 49 and 51 are axially separated by an annular groove 53. In the particular embodiment shown, the inside diameter of the isolator 46 is 1.25 inch, and the outer diameters of the radial walls 49 and 51 are 1.75 inch and 1.375 inch, respectively, the thickness of the bight wall 47 being about 0.030 inch and that of the radial walls 49 and 51 being about 0.060 inch.

OPERATION

The central opening 24 of plate 13 is dimensioned to snugly receive the central portion of the isolator 46, the wall 51 being of diameter exceeding that of central opening 24 but being capable of resiliently snapping therethrough. Moreover, it will be noted that the axial flange 34 of body 28 is dimensioned to snugly telescope within the annular isolator 46.

With the resilient isolator 46 thus received in the central opening 24 of the plate 13 and the resultant subassembly of plate and isolator telescoped over the annular flange 34 of the hub 12 and snugly abutting the wall 37, by reason of a leftward shifting of parts 46 and 13 in FIG. 5, the flange is deformed at its rightward end radially outwardly, as by spinning, to hold the plate 13 close to the end of the hub body 28 and achieve the assembly 10 of FIGS. 1–4, 6 and 7, wherein the isolator 46 is under compression. When in its assembled condition of FIGS. 1–4, 6 and 7, the assembly 10 is thus arranged with the radial flange 22 of plate 13 surrounded (in cross section) by the resilient isolator 46, the central portion of the latter being disposed within the pocket formed between the end wall 37 of body 28 and the radially outwardly deformed flange 34 thereof. Correspondingly, the step 21 of the plate 13 in the central portions of its linear reaches radially overlies corresponding flats 41 and at its points 56 (FIG. 4) radially overlies the spaces B between flats 41. These radially opposed portions of the hub and plate are also spaced by the inner wall 49 of the resilient isolator 46 snugly fitted therebetween. The plate 13 is spaced (as indicated at C in FIG. 3) axially from the tabs 44 to prevent transmission of vibration therebetween.

Thus, the plate 13 is, by clamping of the flange 34, firmly fixed to and telescoped over the end of the hub body 28 while being isolated therefrom, as to transfer of vibration, by the interleaved portions of the resilient isolator 46. On the other hand, the close spaced, parallel overlying relation of the linear portions 55 of the central portion of the plate and the flats 41 of body 28, with the deformed intervening inner wall 49 of isolator 46 snugly disposed therebetween, positively prevents relative rotation between the hub 12 and plate 13.

Thus, rotative driving of the plate by the hub takes place from the flats 41 of the hub to the planar portions 55 of the plate through the inner wall 49 of the isolator 46 and the inner wall 49 thereby provides the major isolation against vibration transfer from the hub to the plate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a plate and hub assembly for a blower wheel, the combination comprising:
   a radially extended plate having an axially stepped, substantially polygonal central portion and a central opening in said central portion;
   an annular hub having a substantially polygonal end portion of substantially similar configuration to said stepped portion of said plate and further having an annular flange extending axially from said end portion, said hub and plate being telescoped, the hub end portion and annular flange being received in the plate stepped central portion and central opening, respectively;
   annular resilient isolator means snugly interposed between opposed surfaces of the hub and plate for reducing vibration transfer therebetween, said substantially polygonal portions of said hub and plate being close spaced and sandwiching a portion of said isolator means for preventing significant relative circumferential movement between said hub and plate, said annular flange extending radially outwardly at least at its outer end to firmly axially lock said plate and isolator means on said hub.

2. The apparatus of claim 1, in which said substantially polygonal end portion of said hub comprises a circumferentially spaced series of axially extending flats and said substantially polygonal portion of said plate includes an axially offset, radially extending wall connected to said plate through a substantially axially extending stepped wall comprising a circumferentially distributed series of substantially planar segments, said planar segments being radially registerable and spaced from and substantially parallel to corresponding ones of said flats, a portion of said isolator means being snugly disposed between planar segments and said flats for preventing transfer of vibration therebetween, said flats extending to one end of said hub terminating said hub end portion.

3. The apparatus of claim 2, in which the maximum radius of said hub end portion exceeds the minimum distance of said planar segments from the center of said plate for positively preventing relative rotation between said hub and plate at least beyond the circumferential width of a given one of said flats, the portion of said resilient isolator means interposed between said planar segments and said flats in snug fitted relation therewith resiliently preventing relative rotation of smaller increments between said plate and hub.

4. The apparatus of claim 2, in which the exterior radius of said annular flange is less than the minimal spacing between the center of said hub and said flats for determining a circumferentially continuous, radially extending hub end surface therebetween, said offset radially extending wall of said plate being pocketed between said radial end surface of said hub and a radially outwardly deformed portion of said annular flange of said hub, said isolator means being interposed therebetween, said axially extending stepped wall overlying the portion of the flats adjacent said radial end surface of said hub and having a portion of said isolator means therebetween.

5. The apparatus of claim 2, in which said resilient isolator means comprises a circular resilient member of substantially J-shaped cross section having an axially extending bight portion terminating at its ends in radially outwardly extending inner and outer wall portions, said wall portions being spaced sufficiently as to admit the offset radially extending wall of such stepped central portion of said plate therebetween, said axially inner wall portion being substantially longer than said outer wall portion, the cross section of said circular resilient member being deformed by clamping against the end of said hub by radially outward deformation of said annular hub flange, said outer wall portion extending radially outboard of said hub flange and said radially inner wall portion being sandwiched between said flats and said planar segments.

6. The apparatus of claim 2, in which said flats terminate inboard of the end of the hub in corresponding radially outwardly extending tabs which are close spaced axially inboard of said plate.

* * * * *